United States Patent [19]

Starzewski et al.

[11] Patent Number: 5,049,427
[45] Date of Patent: Sep. 17, 1991

[54] LAMINATED POLARIZERS

[75] Inventors: Karl H. A. O. Starzewski, Bad Vilbel; Hanns P. Müller, Bergisch Gladbach; Tillmann Hassel, Cologne, all of Fed. Rep. of Germany

[73] Assignee: Bayer Aktiengesellschaft, Leverkusen, Fed. Rep. of Germany

[21] Appl. No.: 446,943

[22] Filed: Dec. 6, 1989

[30] Foreign Application Priority Data

Dec. 21, 1988 [DE] Fed. Rep. of Germany ....... 3842968

[51] Int. Cl.$^5$ .................... G02B 5/30; B29D 11/00; B32B 7/06
[52] U.S. Cl. ...................................... 428/40; 428/343; 428/354; 428/424.8; 428/910; 359/490
[58] Field of Search ................... 428/423.1, 40, 424.8, 428/500, 411.1, 523, 343, 354, 910; 350/398

[56] References Cited

U.S. PATENT DOCUMENTS 4,893,911 1/1990 Starzewski et al. ................ 350/398

Primary Examiner—Alexander S. Thomas
Attorney, Agent, or Firm—Sprung, Horn, Kramer & Woods

[57] ABSTRACT

Laminated polarizers are described comprising a polarizing core layer and adhesive layers on one or both sides, each of which can accept a transparent outer layer, the polarizer being a polymer product containing polyacetylene, whose matrix is a polymer having polar groups, and as adhesive layers, in addition to conventional adhesives, such as epoxy resins or acrylic polymers, thermoplastic polyurethane-polyureas are used in particular, having a predominantly linear molecular structure with urethane segments and urea segments bonded exclusively aliphatically or cycloaliphatically.

15 Claims, No Drawings

LAMINATED POLARIZERS

BACKGROUND OF THE INVENTION

The invention relates to laminated polarizers which comprise a polarizing core layer made from a polymer containing polyacetylene (PAC) and adhesive layers on one or both sides made from a particular polyurethane-polyurea, each of the said adhesive layers being able to accept a transparent outer layer.

The production of laminates made from different substrates with adhesive (sticking) layers located between them is known. BE No. 617,286 discloses a laminate made from an optical element and glass using a cross-linked epoxy resin as adhesive layer. In order to cross-link the said epoxy resin, it has to be reacted at 95° C. for 48 hours. Examples of other known adhesive layers are: epoxy resins which cure with amines, acid anhydrides or polyamides (DE-OS No. 1,594,044; U.S. Pat. No. 4,416,946); acrylate systems, which may be monomeric or oligomeric systems with vinyl groups, which can be cured by thermal, free radical or photochemical means after application of the outer layer [JP Nos. 56/33,610 (1981), 59/58,410 (1984), 59/48,714 (1984), 58/171,008 (1983)]; mixtures of polyacrylates with phenolic resins, which are applied in solution [JP No. 55/155,307 (1980)]; isocyanate adhesives [JP No. 53/47,696 (1978)] and polyurethanes [JP No. 60/159,704 (1985)].

While with many laminates, mechanical properties such as strength, energy absorption characteristics (safety glasses) and an adequate adhesion of the laminate components generally are of paramount importance, there are other additional requirements in the case of the highly effective laminated polarizers according to the invention; namely:
(1) high transparency, all clouding phenomena having to be excluded,
(2) a high degree of light fastness
(3) protection of the polarizing core layer from chemical environmental influences
(4) compatibility of the adhesive layers and if appropriate of the outer layers with the polarizing core layer without impairment of the optical properties.

In principle, it is also possible to use the adhesive layers mentioned above for the lamination of polymers containing polyacetylene, whose matrix is a polymer with polar groups. The polyurethane-polyureas described in more detail below are, however, advantageously suitable for this purpose.

Laminated polarizers have been found made from a polarizing core layer and adhesive layers on one or both sides, each of which can accept a transparent outer layer, the polarizer being a polymer product containing polyacetylene the matrix of the polymer product being a polymer having polar groups.

DETAILED DESCRIPTION OF THE INVENTION

Suitable adhesive layers must be transparent and are in principle known to those skilled in the art. Epoxy resins and acrylic polymers may for example be mentioned. In particular, for the adhesive layers, thermoplastic polyurethane-polyureas having a predominantly linear molecular structure with urethane segments and urea segments bonded exclusively aliphatically or cycloaliphatically, are used which are distinguished by having
(a) a content of urea groups —NH—CO—NH— of 1–20% by weight and
(b) a content of carboxyl groups —COOH bonded directly to the main chain of the molecule in lateral positions, of 0.001–10% by weight, all relative to the total weight of the polyurethane-polyureas.

The polyurethane-polyureas mentioned are adhesive materials with high light fastness and high transparency. Furthermore, they impart excellent adhesion between the outer layers mentioned and the polarizing core layer. They moreover impart high edge stability to the whole laminate, as can be seen from the boiling test with whole laminates produced using this adhesive. This boiling test simultaneously reveals the high barrier effect against water. This high edge stability and the barrier effect against water are extraordinarily important in order effectively to prevent the penetration of water to the polarizing core layer, since the matrix of the polarizing core layer, containing polar groups, is in many cases sensitive to water. Thermoplastic polyurethane-polyureas of this type have been disclosed in DE-OS No. 2,644,434 and by the equivalent thereto, U.S. Pat. Nos. 4,166,149, 4,174,240 and 4,254,176.

The polyurethane-polyureas which are to be used as adhesive layers may, for example, be applied by pouring a solution of this adhesive material onto the polarizing core layer and evaporating the solvent. The polarizing core layer thus provided with adhesive layers on one or both sides may then be bonded to the outer layers. It is likewise possible in the case of outer layers which are to be used to operate the other way around and to initially apply adhesive material to the outer layer(s), after which joining of the outer layers provided with adhesive layers with the polarizing core layer is again undertaken. Still further production methods comprise, for example, coextrusion of the three layers in a manner known in principle to those skilled in the art.

The polyurethane-polyureas used according to the invention for the production of the adhesive layers are particularly effective as hot melt adhesives and thus bond the core layer to the outer layers under the influence of relatively high temperature and pressure, for example at 100°–200° C. and at 5–50 bar. In addition to pressure bonding at elevated temperature swelling of the adhesive layers with a suitable solvent, for example methylene chloride or tetrahydrofuran is also possible, the bond being produced likewise under pressure but without the application of elevated temperature, after applying the other layers of the laminate.

Under normal conditions, adhesive layers made from the polyurethane-polyureas used according to the invention are tack-free. The laminated polarizers according to the invention therefore comprise the polarizing core layer and the adhesive layers on both sides. The adhesive layers may bear outer layers.

It is thereby possible to initially apply only adhesive layers made from polyurethane-polyureas of this type to both sides of the polarizing core layer and instead of directly applying outer layers, for example in successive production steps, to apply both outer layers, for example under the influence of elevated temperature and pressure only during a much later procedure (occasioned by intermediate storage and/or transport).

This can give considerable advantages when delivering, for example by saving weight or by avoiding damage in transport, for example when the outer layers are to be of glass.

Laminated polarizers of this type may for example be protected against contamination and damage by lamination with a poorly adhering, removable outer film, made for example from polyethylene or silicone-treated paper.

The preparation of the polyurethane-polyureas which are to be used according to the invention is carried out for example according to the prepolymer principle, i.e. by reacting an excess of a suitable diisocyanate with dihydroxy compounds to form the corresponding prepolymers having isocyanate groups in terminal positions and subsequently extending the chain of these prepolymers with diamine chain extension agents. The co-application in small amounts of monofunctional reactants as chain terminators is possible here if appropriate in order to control the molecular weight and thereby to adjust the physical properties of the polymer. In general, the type and relative proportions of the structural components are selected in such a way that a calculated molecular weight between 10,000 and 500,000, preferably between 20,000 and 200,000, results. In the preparation of the polyurethane-polyureas which are to be used according to the invention, the bifunctional structural components are generally used in amounts such that 1.1 to 4, preferably 1.2 to 3, isocyanate groups and 0.1 to 3, preferably 0.2 to 2, amino groups of the chain extension agents are utilized per hydroxyl group of the alcohol structural component.

Diisocyanates suitable for the preparation are those of the formula Q (NCO)$_2$ having aliphatically and/or cycloaliphatically bonded isocyanate groups in which Q is an aliphatic hydrocarbon radical having 2 to 12 C atoms or a cycloaliphatic or mixed aliphatic-cycloaliphatic hydrocarbon radical having 4 to 15 C atoms. Examples of diisocyanates of this type are ethylene diisocyanate, tetramethylene diisocyanate, hexamethylene diisocyanate, dodecamethylene diisocyanate, cyclobutane-1,3-diisocyanate, cyclohexane-1,3- and 1,4-diisocyanate, 4,4'-diisocyanato-dicyclohexylmethane or 1-isocyanato-3,3,5-trimethyl-5-isocyanatomethyl-cyclohexane (isophorone diisocyanate) or any desired mixtures of diisocyanates of this type. Cycloaliphatic or mixed aliphaticcycloaliphatic diisocyanates are preferably used, particularly preferably isophorone diisocyanate.

The alcoholic structural components are:
(i) the relatively high molecular weight diols known per se from polyurethane chemistry, in the molecular weight range 300 to 6,000, preferably 800 to 3,000,
(ii) dihydroxycarboxylic acids of the formula

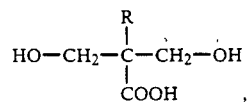

in which R represents hydrogen or a $C_1$–$C_4$ alkyl radical and optionally
(iii) low molecular weight aliphatic or cycloaliphatic diols, preferably in the molecular weight range 62 to 300.

The relative proportions of the individual components (i), (ii) and (iii), which may be reacted simultaneously or successively with the isocyanate component, are preferably selected here in such a way that 0.01 to 12 hydroxyl groups of the component (ii) and 0 to 10 hydroxyl groups of the component (iii) are present per hydroxyl group of the component (i). Component (i) may comprise the polyester diols, polyether diols, polythioether diols, polyacetal diols or polyester amide diols known per se. The polyester diols or polyether diols known per se from polyurethane chemistry are preferably used. Their preparation and composition is known to those skilled in the art.

Component (ii) of the formula mentioned may for example comprise dimethylol acetic acid, $\alpha,\alpha$-dimethylol propionic acid or $\alpha,\alpha$-dimethylol-n-valeric acid. $\alpha,\alpha$-Dimethylol propionic acid is preferred. The component (iii) too may comprise glycols of the type known to those skilled in the art.

Suitable diamine chain extension agents are preferably aliphatic, cycloaliphatic or mixed aliphatic-cycloaliphatic diamines having primary amino groups, in the molecular weight range 60 to 300.

Examples of these are: ethylene diamine, tetramethylene diamine, hexamethylene diamine, 4,4'-diaminodicyclohexyl methane, 1,4-diaminocyclohexane, 4,4'-diamino-3,3'-dimethyl-dicyclohexylmethane or 1-amino-3,3,5-trimethyl-5-aminomethylcyclohexane (isophoronediamine). 4,4'-diamino-dicyclohexylmethane or isophoronediamine are preferably used.

Monofunctional reactants for adjusting to the desired molecular weight (chain terminators) are generally concomitantly used in amounts from 0.05 to 3, preferably 0.1 to 1% by weight, relative to the total amount of the structural components. The following monofunctional reactants may be mentioned by way of example: monoisocyanates, such as methyl isocyanate; monoalcohols, such as methanol, ethanol, butanol, tertbutanol, octanol, isopropanol, cyclohexanol; monoamines, such as methylamine, butylamine, dibutylamine.

The preparation of these polyurethane-polyureas which are to be used as adhesive layers in the laminated polarizers according to the invention is preferably carried out at the prepolymer stage, generally at about 80° to 150° C. The end point of the reaction is determined by NCO titration. After the formation of the prepolymer, the chain extension reaction then occurs with the diamine chain extension agent either in the melt or in solution, the solvents which are suitable for the latter being known to those skilled in the art. The chain extension reaction can be carried out particularly advantageously in heated reaction extruders. In order to carry out the chain extension reaction, adjustment is made to a temperature of 120° to 300° C., preferably 150° to 250° C.

The adhesive layers in the laminated polarizers according to the invention have, for example, a layer thickness of 0.5–50 μm, preferably 0.5–20 μm. In the case of the production of adhesive layers of this type by the casting technique, multiple casting is possible in order to obtain thicker layers. The outer layers have thicknesses of 5 μm to 1 mm, preferably 5–100 μm. The polarizing core layer has a thickness of 1–100 μm, preferably 5–50 μm. Such outer layers may be even thicker in the case where optical lenses and/or prisms come into consideration for the outer layer.

Examples of suitable outer layers are aromatic polyesters, polyacrylonitriles, poly(meth)acrylates, polysulphones, aromatic polycarbonates, cellulose acetates, cellulose acetate butyrates, polyamides, polyhydantoins, polyimides, polyamide-imides, polyparaphenylenebenzo-bis-imidazoles and —oxazoles, polyether ketones and mineral glasses, particular mention being made of the polyesters, poly(meth)acrylates, polycarbonates, cellulose esters and mineral glasses. The transparency of these materials is their most important feature. They are generally used as thin sheets or as films.

The polarizing core layer is a polarizer made from polymer products containing polyacetylene (PAC), whose matrix is a polymer with polar groups, and which has a maximum degree of polarization P of at least 90%, preferably at least 95%, particularly preferably at least 98%, and a maximum dichroic ratio $Q_E$ of 5 or more, preferably 10 or more, both relative to the visible light range. These polarizers are used as films, in which a preferred direction is produced by stretching. Here, the stretch ratio $\epsilon$ is more than 200%, preferably at least 500%, particularly preferably at least 600%.

The degree of polarization P, the dichroic ratio $Q_E$ and the stretch ratio $\epsilon$ are defined as follows:

$$P = \frac{\text{Transmission in the transmitting position minus Transmission in the blocking position}}{\text{Transmission in the transmitting position plus Transmission in the blocking position}} \times 100$$

$$Q_E = \frac{\text{Extinction in the blocking position}}{\text{Extinction in the transmitting position}}$$

(both quantities apply to linearly polarized light).

$$\epsilon = \frac{l - l_o}{l_o} \times 100$$

($l$ = length after stretching; $l_o$ = length before stretching)

Polarizers of the type which may be used according to the invention may for example be produced by polymerization of acetylene in the solution of a polymer having polar groups in the presence of a nickel catalyst, which is obtained by reacting a nickel (0) compound or a compound which can be converted in situ into a nickel (0) compound, with phosphorus compounds, such as are disclosed in EP No. 0,249,019 A 1, preferably with phosphorus compounds of the formulae

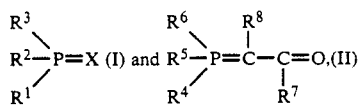

in which $R^1$, $R^2$ and $R^3$ independently of each other denote straight-chain or branched $C_1$-$C_{20}$-alkyl, $C_1$-$C_{20}$-alkoxy, $C_3$-$C_8$-cycloalkyl, $C_2$-$C_6$-alkenyl, $C_6$-$C_{12}$-aryl, $C_6$-$C_{12}$-aryloxy, $C_7$-$C_{15}$-aralkyl or di($C_1$-$C_4$-alkyl)-amino, $R^4$, $R^5$, $R^6$, $R^7$ and $R^8$ independently of each other denote straight-chain or branched $C_1$-$C_{20}$-alkyl, $C_2$-$C_{30}$-alkenyl, $C_1$-$C_{20}$-alkoxy, $C_3$-$C_8$-cycloalkyl, $C_6$-$C_{12}$-aryl, $C_6$-$C_{12}$-aryloxy or $C_7$-$C_{15}$-aralkyl, and $R^7$ may additionally denote hydrogen and $R^8$ may additionally denote hydrogen and acyl and X denotes double-bonded oxygen, the group $NR^9$ or the group

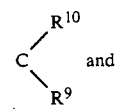

$R^9$ and $R^{10}$ independently of each other denote hydrogen, silyl, acyl, phenyl, cyano or $R^1$.

Phosphorus compounds of the formulae (I) and (II) in which X denotes $CR^9R^{10}$ and $R^4$ represents $C_6$-$C_{12}$-aryl are preferably used.

It is particularly preferable to carry out the acetylene polymerization in the presence of a nickel compound, which can be prepared by reacting a nickel (0) compound or a compound which can be converted in situ into a nickel (0) compound with compounds of the formulae

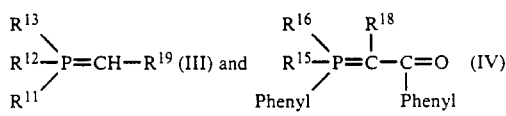

in which $R^{11}$, $R^{12}$, and $R^{13}$ independently of each other denote $C_1$-$C_8$-alkyl, phenyl or benzyl, $R^{15}$, $R^{16}$ and $R^{18}$ independently of each other denote $C_1$-$C_8$-alkyl and phenyl, and $R^{18}$ may additionally denote hydrogen or acyl, and $R^{19}$ represents hydrogen, $C_1$-$C_8$-alkyl or phenyl.

Most particularly preferred phosphorus compounds are those of the formulae

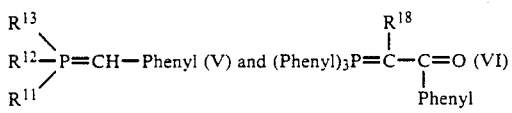

in which $R^{11}$, $R^{12}$, $R^{13}$ and $R^{18}$ have the meaning given above.

In order to prepare the catalyst, 1-4 mol of the compound of the formula (I) or (III) or (V) and 1-4 mol of the compound of the formula (II) or (IV) or (VI), are used per mol of nickel (0) compound, and preferably about 1 mol of the compound of the formula (I) or (III) or (V) and about 1 mol of the compound of the formula (II) or (IV) or (VI) are used per mol of the nickel (0) compound.

The catalyst is prepared at a temperature of 0° to 100° C., preferably 20° to 70° C. The preparation is carried out with the exclusion of oxygen, preferably in a solvent, which must be inert towards the reactants, such as benzene, toluene, cyclohexane or n-hexane. After it has been prepared, the catalyst is normally isolated as a solid by filtration, the solution being concentrated and/or cooled beforehand as required. However, the catalyst may also be used directly for the polymerization of acetylene without being isolated, i.e. as a solution.

Examples of nickel (0) compounds which may be mentioned are Ni(cyclooctadiene)$_2$ and Ni(allyl)$_2$. The following may be mentioned as examples of nickel compounds, which can be converted in situ into nickel (0) compounds: Ni acetylacetonate, Ni octanoate and Ni stearate, which can be reduced with the aid of conventional reducing agents, such as borohydride, aluminium hydride, aluminium alkyls or organolithium compounds.

The following may be mentioned as examples of straight-chain or branched $C_1$-$C_{20}$-alkyl: methyl, ethyl, propyl, isopropyl, butyl, isobutyl, tert-butyl, and the isomeric amyls, hexyls, octyls, decyls, dodecyls, and eicosyls. A preferred alkyl has 1-8 carbon atoms.

The following may be mentioned as examples of straight-chain or branched $C_1$-$C_{20}$-alkoxy: methoxy, ethoxy, propoxy, isopropoxy, butoxy, isobutoxy, tert-butoxy and the isomeric amyloxy, hexyloxy, octyloxy, decyloxy, dodecyloxy and eicosyloxy. A preferred alkoxy has 1-8 carbon atoms.

The following may be mentioned as examples of $C_3$-$C_8$-cycloalkyl: cyclopropyl, cyclobutyl, cyclopentyl, cyclohexyl, methylcyclopentyl, methylcyclohexyl, cycloheptyl, cyclooctyl.

The following may be mentioned as examples of $C_5$-$C_{12}$-aryl: phenyl, naphthyl, biphenylyl. A preferred aryl is phenyl.

Examples of $C_2$-$C_6$-alkenyl which may be mentioned are: vinyl, propenyl, allyl, butenyl, pentenyl, hexenyl and branched isomers thereof. Further examples of alkenyl are octenyl, decenyl, eicosenyl or triacontenyl.

The following may be mentioned as examples of $C_6$-$C_{12}$-aryloxy: phenoxy, naphthyloxy, biphenyloxy. Phenoxy is preferred.

The following may be mentioned as examples of di($C_1$-$C_4$-alkyl)-amino: dimethylamino, diethylamino, dipropylamino, methylbutylamino, ethylbutylamino and so on.

Examples of silyl which may be mentioned are tri-$C_1$-$C_4$-alkylsilyl, triphenylsilyl or mixed trisubstituted alkylphenylsilyls, preferably tri-$C_1$-$C_4$-alkylsilyls, such as trimethylsilyl, triethylsilyl and so on.

Acyls which may be mentioned are $C_1$-$C_8$-alkylcarbonyl or $C_6$-$C_{12}$-arylcarbonyl, which may be substituted in the manner mentioned below, such as acetyl, propionyl, butyryl, $C_5$-alkyl-carbonyl, $C_8$-alkyl-carbonyl, benzoyl, substituted benzoyl or naphthyl-carbonyl. A preferred acyl is a substituted or unsubstituted $C_1$-$C_4$-alkylcarbonyl or benozyl. Acetyl or benzoyl are particularly preferred.

The above substituents may be singly to triply, preferably singly or doubly, particularly preferably singly, substituted by $C_1$-$C_4$-alkoxy, by phenyl or phenoxy, and in the case of multiple substitution the substituents may be variously selected from those listed above.

The amount of nickel catalyst used for the acetylene polymerization is not critical. Typical catalyst concentrations are $10^{-1}$-$10^{-5}$, preferably $10^{-2}$-$10^{-4}$ mol of nickel catalyst per liter of polymerization mixture.

The polymerization of the acetylene may be carried out both continuously and discontinuously. During this, a temperature of 20°-120° C., preferably 40°-110° C., particularly preferably 60° to 100° C., is maintained.

The polymerization may be carried out at normal pressure but polymerization is also possible at increased pressure, for example at 1.01-20 bar, employing if appropriate a mixture containing a protective gas (such as $N_2$).

The acetylene can be taken from a pressure bottle and used without further purification. With catalysts which are sensitive to acetone it may be necessary to freeze out in a cold trap beforehand, any acetone which is contained in the acetylene.

The polymerization of the acetylene is carried out in a polymer solution of a polymer bearing polar groups. Here, polar groups are halogen atoms, nitrile groups, hydroxyl groups, ester groups and the like. Examples of suitable polymers of this type bearing polar groups are polyvinyl chloride, polyvinyl alcohol (PVA) made from partially saponified polyvinyl acetate (PVAC) and other (co)polymers containing vinyl alcohol, polyacrylonitrile, copolymers containing acrylonitrile, polyvinylpyrrolidone, methylcellulose and other cellulose derivatives, polycarbonate and so on; solutions of polyvinyl chloride, polyvinyl alcohol (PVA) made from partially saponified PVAC and other (co)polymers containing vinyl alcohol, polyacrylonitrile, copolymers containing acrylonitrile, and polyvinylpyrrolidone are preferably used.

The polyvinyl alcohol made from partially saponified PVAC which is particularly preferably to be used as a solution, is in this case a polymer which has a degree of saponification of 70-90%, for example, preferably 80-90%.

These polymers containing polar groups are present in the form of a solution. Solvents for this purpose are for example dimethylformamide (DMF), dimethyl sulphoxide (DMSO) and so on. The concentration of the polymer in the solvent is 1-20% by weight, preferably 2-10% by weight.

In order to produce the highly effective polarizers which can be used according to the invention, the polymerization of the acetylene is carried out in the solution of a polymer bearing polar groups in the presence of the nickel catalyst described, during a time interval of 5-1000 sec, preferably 5-600 sec.

The polarizers for the core layer which are obtained by short-duration polymerization (5-600 sec) and using the preferred catalysts are highly effective. They have a maximum degree of polarisation which is even higher than described above, namely at least 95%, preferably at least 98%, particularly preferably at least 99%.

Highly effective polarizers of this type furthermore have a dichroic ratio $Q_E$ of 10 or more over almost the whole wavelength range of visible light, namely in the range 400-800 nm. This ratio $Q_E$ applies to a certain wavelength and in the case of suitable dichroic dyes is limited to a narrow wavelength range of visible light. This is discernible from the inherent colour of polarizers produced with the aid of dichroic dyes; the said materials are moreover difficult to distribute uniformly over a relatively large surface of a film which is to be coloured with the said dyes.

In contrast, the highly effective polarizers just described exhibit a high $Q_E$ value over almost the whole range of visible light and are therefore colour-neutral, which is discernible from their inherent grey colour.

Films are produced from the polymer products containing polyacetylene (PAC), which can be carried out by casting from the solutions which arise during polymerization. The films are stretched in the manner discussed above.

The polymerization solution described above may be used directly for casting; however, stabilizers and/or plasticizers may also be added before processing in a manner familiar to those skilled in the art. Stabilizers of this type (for example UV-stabilizers) may, however, be incorporated additionally or alternatively into the adhesive layers or the outer layers. It is preferable to incorporate the stabilizers in the adhesive layers or the outer layers.

If the matrix of the polymer product containing polyacetylene (PAC) is a PVA, the polymer product containing polyacetylene may also be precipitated from the polymerization solution and freed from solvent, for example dimethylformamide. The polymer product can then be taken up in water and cast therefrom. In this case it is advisable to add a plasticizer to this polymer solution. Precipitating agents are, for example, toluene, cyclohexane, acetone, methanol, ethanol and others in which PVA is not soluble.

The lamination imparts mechanical stability to the polarizer and protects it from being swollen by solvents or water. Chemical stability is moreover achieved, for example by protection from atmospheric substances. The ease of handling is significantly increased by virtue of adequate stability and the possibility of cleaning the surface.

The optometric data of the polarizer formed in this manner, with light of wavelength 600 nm, were:
Dichroic ratio $Q_E$: 21.4
Degree of polarization P: 99.4%

The optometric data (including those from the following examples) were measured with the aid of a spectrophotometer of the type Uvikon 810 P supplied by Kontron.

EXAMPLES 3-6

Other polarizers containing polyacetylene (PAC) were produced analogously to Examples 1 and 2. Their properties are listed in the following table.

| Example | Catalyst | Amount of catalyst per 5 g of PVA mmol | PVA concentration in DMF % | Polymerization Temp. °C. | Polymerization Time sec | 1st absorption maximum of the reaction solution λ/nm | Degree of stretching % | Optometric data for 600 nm Dichroic ratio $Q_E$ | Optometric data for 600 nm Degree of polarization P % |
|---|---|---|---|---|---|---|---|---|---|
| 3 | NiPh(Ph$_2$PCHCPhO) (Pr$_3^i$PCHPh) | 0.25 | 5 | 80 | 15 | 637 | 720 | 21.2 | 99.7 |
| 4 | NiPh(Ph$_2$PCHCMeO) (Ph$_3$PCH$_2$) | 1.0 | 5 | 80 | 15 | 459 | 736 | 8.7 | 99.6 |
| 5 | NiPh(Ph$_2$PCHCPhO) (Me$_3$PCH$_2$) | 0.375 | 7.5 | 65 | 15 | 571 | 790 | 18.7 | 93.2 |
| 6 | NiPh(Ph$_2$PCHCPhO) (Me$_3$PCH$_2$) | 0.25 | 10 | 80 | 600 | | 400 | 9.9 | 92.9 |

The degree of order in a stretched core layer is not reduced by the formation of the laminate and by the addition of plasticizers and/or stabilizers. This is also true of lamination by hot melt adhesion.

EXAMPLE 1

Preparation of catalyst 5 mmol of bis-cyclooctadiene-nickel (0) in 100 ml of dry toluene saturated with nitrogen were mixed under nitrogen with 5 mmol of benzoyl-methylene-triphenylphosphorane and 5 mmol of methylene-trimethylphosphorane. The mixture was heated with vigorous stirring for about 1 hour at 40° to 60° C. The dark yellowish-brown solution was filtered and concentrated in vacuo to dryness. The yellow catalyst was dissolved in 25 ml of dry dimethylformamide saturated with nitrogen. This solution or a part thereof was used in the subsequent polymerization of acetylene.

EXAMPLE 2

5 g of polyvinyl alcohol (degree of saponification 88%) were dissolved in 245 g of dry DMF (degassed, saturated with N$_2$) at 120° C. in a 250 ml reaction flask (gas inlet, dropping funnel without pressure compensation with N$_2$ feed, stirrer, internal thermometer, reflux condenser with bubble gauge) and then adjusted to a temperature of 80° C. Then 1.0 mmol of the catalyst described in Example 1 in 5.0 ml of DMF were stirred in under N$_2$ and a uniform stream of acetylene gas (dry ice/acetone) was fed in for 15 sec. The reaction solution was then filtered through a polyamide cloth having a mesh width of 200 μm.

The clear blue PVA-PAC solution (absorption maximum 633 nm) was spread hot on a PET film with a doctor blade to form a 400 μm layer. After evaporation of the solvent a clear, blue film was obtained, which was pulled off the base and stretched at about 130° C. to 760%.

EXAMPLE 7

A polyvinyl alcohol-polyacetylene film produced analogously to Example 2-6 and stretched at 145° C., which contained 2% of glycerol as plasticizer, relative to the matrix, which plasticizer has been added to the casting solution after polymerization was complete, had the following optometric data for light of wavelength 600 nm:
Dichroic ratio $Q_E$: 19.5,
Degree of polarization P: 99.7%
and was laminated as follows:

2 mm thick glass sheets were coated on one side using a doctor blade to a layer thickness of 400μ with a polyurethane polyurea (PU) in accordance with DE No. 2,644,434, as a 5% strength solution in methylene chloride (the solution contained 10% UV-absorber of the formula

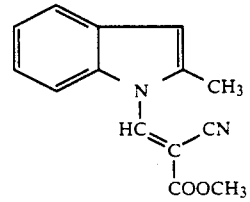

(Bayer UV 340 ®) relative to PU), and dried. The approximately 12μ thick polarizing film described above was laid between the PU- coated sides of two such glass sheets and subjected to a pressure of 20 bar at 150° C. for 5 min. A polarizer resulted which had the following properties with light of wavelength 600 nm:
Dichroic ratio $Q_E$: 19.4
Degree of polarization P: 99.6%

Corresponding results were obtained, when the core layer was provided with adhesive layers and subsequently the outer layers were applied.

Likewise comparable results were obtained when this polarizing core layer provided with a PU- adhesive layers was covered with silicone treated paper, placed in intermediate storage for 1 week and only then bonded with the outer layers.

EXAMPLE 8

A 1000 hour stability test was carried out in each case in relation to heat resistance at 100° C. and to UV resistance, using 2 PU-bonded PVA-PAC polarizing films laminated to glass.

Afterwards the polarizing properties with light of wavelength 600 nm were afterwards as follows:

|  | Heat test (1000 h, 100° C.) | Xenon lamp test (1000 h, UV) |
| --- | --- | --- |
| Dichroic ratio $Q_E$: | 18.7 | 19.6 |
| Degree of polarization P: | 99.6% | 99.2% |

What is claimed is:

1. A laminated polarizer made from a polarizing core layer and adhesive layers on one or both sides, each of which can accept a transparent outerlayer, the polarizer comprising a polymer product containing polyacetylene as core layer, the matrix of the polymer product being a polymer having polar groups wherein as adhesive layers, a thermoplastic polyurethane-polyurea is used having a predominantly linear molecular structure with urethane segments and urea segments bonded exclusively aliphatically or cyclo-aliphatically, and which are distinguished by having
   (a) a content of urea groups —NH—CO—NH— of 1–20% by weight and
   (b) a content of carboxyl groups —COOH bonded directly to the main chain of the molecule in lateral positions, of 0.001–10% by weight, all relative to the total weight of the polyurethane-polyureas.

2. The laminated polarizer of claim 1, produced by applying the adhesive layers to the polarizing core layer and applying the transparent outer layers by hot melt adhesion after an intervening period of time.

3. The laminated polarizer of claim 2, wherein the adhesive layers are provided with an easily removable protective layer.

4. The laminated polarizer of claim 1, comprising outer layers applied on one or both sides, made from a mineral glass, an aromatic polyester, polyacrylonitrile, poly(meth)acrylate, polysulphone, aromatic polycarbonate, cellulose acetate, cellulose acetate butyrate, polyamide, polyhydantoin, polyimide, polyamideimide, polyparaphenylenebenzo-bis-imidazole and -oxazole or a polyether ketone.

5. The laminated polarizer of claim 4, comprising outer layers applied on one or both sides, made from an aromatic polyester, polyacrylate, polycarbonate, cellulose ester or a mineral glass.

6. The laminated polarizer of claim 1, comprising a polarizing core layer in the form of a stretched film, with a stretch ratio ε of more than 200%.

7. The laminated polarizer of claim 6, wherein the stretch ratio is at least 500%.

8. The laminated polarizer of claim 7, wherein the stretch ratio is at least 600%.

9. The laminated polarizer of claim 1, whose polarizing core layer can be produced by polymerizing acetylene in the solution of a polymer having polar groups in the presence of a nickel catalyst, which is obtained by reacting a nickel (0) compound or a compound which can be converted in situ into a nickel (0) compound, with phosphorus compounds of the formulae

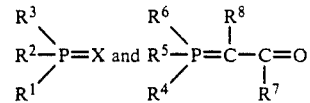

in which
  $R^1$, $R^2$ and $R^3$ independently of each other denote straight-chain or branched $C_1$–$C_{20}$-alkyl, $C_1$–$C_{20}$-alkoxy, $C_3$–$C_8$-cycloalkyl, $C_2$–$C_6$-alkenyl, $C_6$–$C_{12}$-aryl, $C_6$–$C_{12}$-aryloxy, $C_7$–$C_{15}$-aralkyl or di($C_1$–$C_4$alkyl)-amino,
  $R^4$, $R^5$, $R^6$, $R^7$ and $R^8$ independently of each other denote straight-chain or branched $C_1$–$C_{20}$-alkyl, $C_2$–$C_{30}$-alkenyl, $C_1$–$C_{20}$-alkoxy, $C_3$–$C_8$-cycloalkyl, $C_6$–$C_{12}$-aryl, $C_6$–$C_{12}$-aryloxy or $C_7$–$C_{15}$-aralkyl, and $R^7$ may additionally denote hydrogen and $R^8$ may additionally denote hydrogen or acyl and
  X denotes double-bonded oxygen, the group $NR^9$ or the group

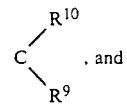

$R^9$ and $R^{10}$ independently of each other denote hydrogen, silyl, acyl, phenyl, cyano or $R^1$.

10. The laminated polarizer of claim 9, wherein the nickel catalyst for producing the polarizing core layer is obtained by reaction with phosphorus compounds of the formulae

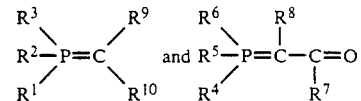

in which
  $R^1$, $R^2$, and $R^3$ independently of each other denote straight-chain or branched $C_1$–$C_{20}$-alkyl, $C_1$–$C_{20}$-alkoxy, $C_3$–$C_8$-cycloalkyl, $C_2$–$C_6$-alkenyl, $C_6$–$C_{12}$-aryl, $C_6$–$C_{12}$-aryloxy, $C_7$–$C_{15}$-aralkyl or di($C_1$–$C_4$-alkyl)-amino,
  $R^4$ represents $C_6$–$C_{12}$-aryl,
  $R^5$, $R^6$, $R^7$ and $R^8$ independently of each other denote straight-chain or branched $C_1$–$C_{20}$-alkyl, $C_2$–$C_{30}$-alkenyl, $C_1$–$C_{20}$-alkoxy, $C_3$–$C_8$-cycloalkyl, $C_6$–$C_{12}$-aryl, $C_6$–$C_{12}$-aryloxy or $C_7$–$C_{15}$-aralkyl, in which
  $R^7$ may additionally denote hydrogen and
  $R^8$ may additionally denote hydrogen or acyl, and
  $R^9$ and $R^{10}$ independently of each other denote hydrogen, silyl, acyl, phenyl, cyano or $R^1$.

11. The laminated polarizer of claim 10, wherein the nickel catalyst for producing the polarizing core layer is obtained by reaction with phosphorus compounds of the formulae

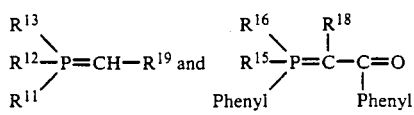
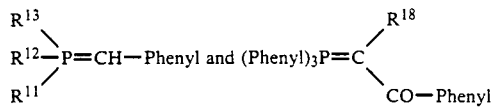

in which
R[11], R[12] and R[13] independently of each other denote $C_1$-$C_8$-alkyl, phenyl or benzyl and
R[15], R[16] and R[18] independently of each other denote $C_1$-$C_8$-alkyl or phenyl, and
R[18] may additionally denote hydrogen or acyl, and
R[19] represents hydrogen, $C_1$-$C_8$-alkyl or phenyl.

12. The laminated polarizer of claim 12, wherein the nickel catalyst for producing the polarizing core layer is obtained by reaction with phosphorus compounds of the formulae in which
R[11], R[12], R[13] and R[18] have the meaning above.

13. The laminated polarizer of claim 10, wherein the polarizing core layer is obtained by short-duration polymerization.

14. The laminated polarizer of claim 13, wherein the matrix of the polymer product containing polyacetylene is a polyvinyl acetate saponified to 70–90%.

15. The laminated polarizer of claim 1, having a content of stabilizers in the polarizating core layer, in the adhesive layer or in the outer layer.

* * * * *

UNITED STATES PATENT AND TRADEMARK OFFICE
CERTIFICATE OF CORRECTION

PATENT NO. : 5,049,427

DATED : September 17, 1991

INVENTOR(S) : Starzewski et al

It is certified that error appears in the above-identified patent and that said Letters Patent is hereby corrected as shown below:

Col. 13   line 15   Delete "claim 12" and substitute -- claim 11 --.

Signed and Sealed this

Eleventh Day of May, 1993

Attest:

MICHAEL K. KIRK

Attesting Officer

Acting Commissioner of Patents and Trademarks